(12) United States Patent
Douthitt et al.

(10) Patent No.: US 9,092,435 B2
(45) Date of Patent: Jul. 28, 2015

(54) SYSTEM AND METHOD FOR EXTRACTION OF META DATA FROM A DIGITAL MEDIA STORAGE DEVICE FOR MEDIA SELECTION IN A VEHICLE

(75) Inventors: Brian L. Douthitt, Holland, MI (US);
Karl W. Schripsema, Holland, MI (US);
Michael J. Sims, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1504 days.

(21) Appl. No.: 12/296,043

(22) PCT Filed: Apr. 3, 2007

(86) PCT No.: PCT/US2007/008063
§ 371 (c)(1),
(2), (4) Date: Apr. 17, 2009

(87) PCT Pub. No.: WO2007/123797
PCT Pub. Date: Nov. 1, 2007

(65) Prior Publication Data
US 2009/0326949 A1    Dec. 31, 2009

Related U.S. Application Data

(60) Provisional application No. 60/789,176, filed on Apr. 4, 2006.

(51) Int. Cl.
*G10L 15/22*    (2006.01)
*G06F 17/30*    (2006.01)
*H04L 29/08*    (2006.01)

(52) U.S. Cl.
CPC .... *G06F 17/30038* (2013.01); *G06F 17/30053* (2013.01); *H04L 67/28* (2013.01); *H04L 67/2842* (2013.01); *G10L 15/22* (2013.01)

(58) Field of Classification Search
CPC ..................................................... G10L 15/22
USPC .................................................. 704/270, 275
See application file for complete search history.

(56) References Cited

U.S. PATENT DOCUMENTS 3,704,345 A    11/1972    Coker et al.
4,827,520 A     5/1989    Zeinstra
(Continued)

FOREIGN PATENT DOCUMENTS

DE    10 2004 016 319 A1    11/2004
JP         2004-309795 A    11/2004
(Continued)

OTHER PUBLICATIONS

Notice of Allowance for U.S. Appl. No. 11/517,832, dated Sep. 10, 2010, 8 pages.
(Continued)

*Primary Examiner* — Jialong He
(74) *Attorney, Agent, or Firm* — Foley & Lardner LLP

(57) ABSTRACT

A method is provided for extracting meta data from a digital media storage device in a vehicle over a communication link between a control module of the vehicle and the digital media storage device. The method includes establishing a communication link between control module of the vehicle and the digital media storage device, identifying a media file on the digital media storage device, and retrieving meta data from a media file, the meta data including a plurality of entries, wherein at least one of the plurality of entries includes text data. The method further includes identifying the text data in an entry of the media file and storing the plurality of entries in a memory.

19 Claims, 5 Drawing Sheets

(56) References Cited

U.S. PATENT DOCUMENTS

| | | |
|---|---|---|
| 5,113,182 A | 5/1992 | Suman et al. |
| 5,214,707 A | 5/1993 | Fujimoto et al. |
| 5,278,547 A | 1/1994 | Suman et al. |
| 5,384,893 A | 1/1995 | Hutchins |
| 5,475,366 A | 12/1995 | Van Lente et al. |
| 5,479,155 A | 12/1995 | Zeinstra et al. |
| 5,479,157 A | 12/1995 | Suman et al. |
| 5,583,485 A | 12/1996 | Van Lente et al. |
| 5,614,885 A | 3/1997 | Van Lente et al. |
| 5,614,891 A | 3/1997 | Zeinstra et al. |
| 5,619,190 A | 4/1997 | Duckworth et al. |
| 5,627,529 A | 5/1997 | Duckworth et al. |
| 5,646,701 A | 7/1997 | Duckworth et al. |
| 5,661,455 A | 8/1997 | Van Lente et al. |
| 5,691,848 A | 11/1997 | Van Lente et al. |
| 5,699,044 A | 12/1997 | Van Lente et al. |
| 5,703,308 A | 12/1997 | Tashiro et al. |
| 5,708,415 A | 1/1998 | Van Lente et al. |
| 5,717,387 A | 2/1998 | Suman et al. |
| 5,854,593 A | 12/1998 | Dykema et al. |
| 5,903,226 A | 5/1999 | Suman et al. |
| 5,926,087 A | 7/1999 | Busch et al. |
| 6,028,537 A | 2/2000 | Suman et al. |
| 6,078,885 A | 6/2000 | Beutnagel |
| 6,154,148 A | 11/2000 | Fluharty et al. |
| 6,202,008 B1 | 3/2001 | Beckert et al. |
| 6,389,337 B1 | 5/2002 | Kolls |
| 6,526,335 B1 | 2/2003 | Treyz et al. |
| 6,584,181 B1 | 6/2003 | Aktas et al. |
| 6,600,430 B2 | 7/2003 | Minagawa et al. |
| 6,622,083 B1 | 9/2003 | Knockeart et al. |
| 6,801,893 B1 | 10/2004 | Backfried et al. |
| 6,874,018 B2 | 3/2005 | Wu |
| 6,928,261 B2 | 8/2005 | Hasegawa et al. |
| 6,993,532 B1 | 1/2006 | Platt et al. |
| 7,024,424 B1 | 4/2006 | Platt et al. |
| 7,047,039 B2 | 5/2006 | Lalley |
| 7,257,426 B1 | 8/2007 | Witkowski et al. |
| 7,295,752 B1* | 11/2007 | Jain et al. ............... 386/285 |
| 7,801,729 B2* | 9/2010 | Mozer ...................... 704/270 |
| 8,150,937 B2* | 4/2012 | Ng et al. .................. 709/217 |
| 2001/0047317 A1* | 11/2001 | Yodo ........................ 705/34 |
| 2002/0048224 A1 | 4/2002 | Dygert et al. |
| 2002/0049717 A1 | 4/2002 | Routtenberg et al. |
| 2002/0082831 A1 | 6/2002 | Hwang et al. |
| 2002/0086719 A1 | 7/2002 | Kedia et al. |
| 2002/0090596 A1 | 7/2002 | Sosoka et al. |
| 2002/0091706 A1 | 7/2002 | Anderson et al. |
| 2002/0107973 A1 | 8/2002 | Lennon et al. |
| 2002/0120925 A1 | 8/2002 | Logan |
| 2002/0197955 A1 | 12/2002 | Witkowski et al. |
| 2003/0014767 A1 | 1/2003 | Stumphauzer, III |
| 2003/0032419 A1 | 2/2003 | Shibasaki et al. |
| 2003/0093260 A1 | 5/2003 | Dagtas et al. |
| 2003/0109218 A1 | 6/2003 | Pourkeramati et al. |
| 2003/0110079 A1 | 6/2003 | Weisman et al. |
| 2003/0137543 A1 | 7/2003 | Anderson et al. |
| 2003/0158737 A1 | 8/2003 | Csicsatka |
| 2003/0163823 A1 | 8/2003 | Logan et al. |
| 2003/0177013 A1 | 9/2003 | Falcon et al. |
| 2003/0228879 A1 | 12/2003 | Witkowski et al. |
| 2004/0022137 A1 | 2/2004 | Campbell et al. |
| 2004/0033821 A1 | 2/2004 | Slesak et al. |
| 2004/0048622 A1 | 3/2004 | Witkowski et al. |
| 2004/0089141 A1 | 5/2004 | Georges et al. |
| 2004/0110472 A1 | 6/2004 | Witkowski et al. |
| 2004/0111271 A1 | 6/2004 | Tischer |
| 2004/0117442 A1 | 6/2004 | Thielen |
| 2004/0131255 A1* | 7/2004 | Ben-Yaacov et al. ........ 382/190 |
| 2004/0194611 A1 | 10/2004 | Kawana |
| 2004/0203379 A1 | 10/2004 | Witkowski et al. |
| 2005/0038813 A1 | 2/2005 | Apparao et al. |
| 2005/0090279 A9 | 4/2005 | Witkowski et al. |
| 2005/0155068 A1 | 7/2005 | Chang |
| 2005/0223406 A1 | 10/2005 | Vitito |
| 2005/0235326 A1 | 10/2005 | Vitito |
| 2005/0235327 A1 | 10/2005 | Vitito |
| 2005/0239434 A1 | 10/2005 | Marlowe |
| 2005/0266879 A1* | 12/2005 | Spaur et al. ................ 455/556.2 |
| 2005/0281414 A1 | 12/2005 | Simon et al. |
| 2006/0034481 A1 | 2/2006 | Barzegar et al. |
| 2006/0070102 A1 | 3/2006 | Vitito |
| 2006/0074895 A1* | 4/2006 | Belknap ........................... 707/4 |
| 2006/0080103 A1* | 4/2006 | Van Breemen ............... 704/270 |
| 2006/0168627 A1 | 7/2006 | Zeinstra et al. |
| 2006/0174026 A1* | 8/2006 | Robinson et al. ............. 709/231 |
| 2006/0181963 A1* | 8/2006 | Clayton et al. ............. 369/24.01 |
| 2006/0206327 A1* | 9/2006 | Hennecke et al. ............ 704/251 |
| 2007/0061067 A1 | 3/2007 | Zeinstra et al. |
| 2007/0082706 A1 | 4/2007 | Campbell et al. |
| 2007/0156410 A1* | 7/2007 | Stohr et al. .................... 704/275 |
| 2007/0198563 A1 | 8/2007 | Apparao et al. |
| 2007/0233725 A1 | 10/2007 | Michmerhuizen et al. |
| 2008/0175411 A1* | 7/2008 | Greve .......................... 381/103 |
| 2009/0076821 A1* | 3/2009 | Brenner et al. ............... 704/260 |

FOREIGN PATENT DOCUMENTS

| | | |
|---|---|---|
| JP | 05-290382 A | 11/2005 |
| WO | WO 2005/019985 A2 | 3/2005 |
| WO | WO 2007/123797 A1 | 11/2007 |
| WO | WO 2007/123798 A1 | 11/2007 |

OTHER PUBLICATIONS

Wikipedia—Speak & Spell (toy), retrieved Sep. 2, 2010, 12 pages.

Office Action for U.S. Appl. No. 11/517,832, dated Mar. 23, 2010, 19 pages.

Office Action for U.S. Appl. No. 11/517,832, dated Sep. 9, 2009, 18 pages.

Gilroy, Amy, Sony Joins in Music Streaming From Cellphones to Car Audio, printed from website www.twice.com on Aug. 17, 2006, 2 pages.

International Search Report and Written Opinion for International Patent Application No. PCT/US2007/008063, mailed Sep. 25, 2007, 8 pages.

International Search Report and Written Opinion for International Patent Application No. PCT/US2007/008064, mailed Sep. 14, 2007, 8 pages.

Jain et al., Standard Boosts Automotive Bluetooth Streaming, Automotive Design Line, printed from website www.automotivedesignline.com on Jun. 15, 2006, 6 pages.

Johnston, Lisa, ANYCOM Announces Bluetooth Adapter for iPod Nano, TWICE: This Week in Consumer Electronics, printed from website www.twice.com on Aug. 17, 2006, 1 page.

Pioneer DEH-P9800BT, CD receiver with MP3/WMA playback and Bluetooth wireless, Crutchfield, printed from website www.crutchfield.com on Nov. 27, 2006, 3 pages.

Sony MEX-BT5000, CD receiver with Bluetooth technology and MP3/WMA playback, Crutchfield, printed from website www.crutchfield.com on Nov. 27, 2006, 2 pages.

US Office Action for U.S. Appl. No. 11/517,832 mailed Sep. 9, 2009, 18 pages.

EP Office Action for Application No. 07754568.9 dated Apr. 17, 2013, 5 pages.

EP Office Action for Application No. 07754569.7 dated Apr. 5, 2013, 4 pages.

* cited by examiner

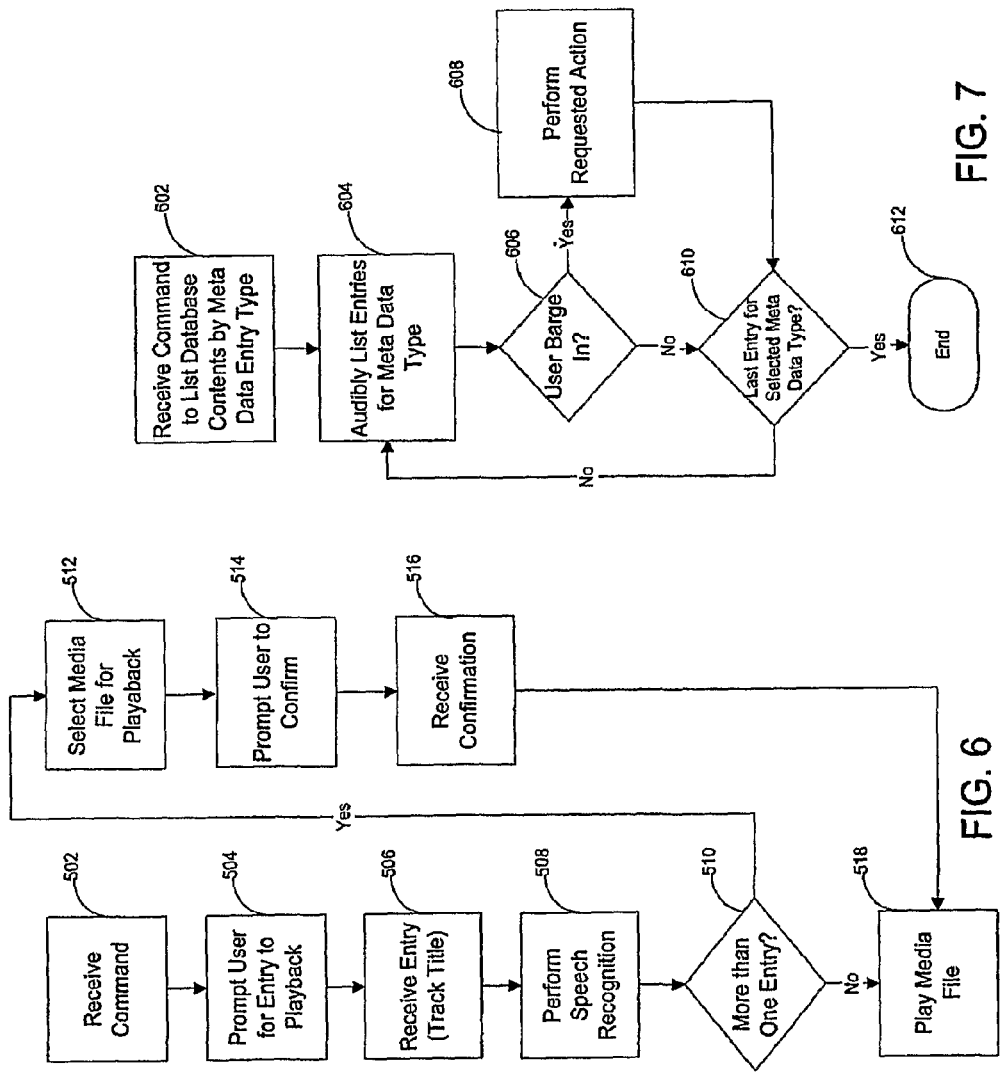

SYSTEM AND METHOD FOR EXTRACTION OF META DATA FROM A DIGITAL MEDIA STORAGE DEVICE FOR MEDIA SELECTION IN A VEHICLE

CROSS REFERENCE

The present application claims the benefit of priority, as available under 35 U.S.C. §119(e)(1) to U.S. Provisional Patent Application No. 60/789,176 titled "System and Method for Extraction of Meta Data from a Digital Media Storage Device for Media Selection in a Vehicle" filed on Apr. 4, 2006 (which is incorporated by reference in its entirety).

FIELD

The present application relates generally to the field of data extraction from a digital audio/video source in a vehicle and in particular, a system and method for extracting and processing meta data from media files accessible from a digital media storage device, such as a media player, in the vehicle.

BACKGROUND

Vehicles typically include a number of electronic systems such as an audio system, a mobile telephone system, a navigation system, video entertainment system, etc. Along with those systems, media players (i.e., digital audio/video players or MP3 players) may be setup in the vehicle for a user to access digital audio or video content stored on the media player. A conventional media player includes a data storage device (i.e., memory) and an embedded software application that allows a user to transfer media files to the player and create custom lists of selected media files, referred to as playlists. Media files may be transferred to the memory of the player from various sources, including disks (e.g., CDs, DVDs, etc.) and Internet sites. Most players are configured to be coupled to a personal computer via a connection port (e.g., USB port, parallel port, serial port, etc.) in order to transfer media files. The media files typically include data, referred to as meta data, which identifies the contents of the file. For example, with digital audio files, such as MP3 files, the meta data comprises a tagging format which may include the title of the song, the artist's name, the title of the album, track number, genre, etc. The tagging format for MP3 (i.e., MPEG Audio Layer III) files is commonly referred to as ID3.

A media player is typically configured to include a memory having one or more media files stored therein. A media player in a vehicle may be configured to be coupled to or integrated with other vehicle electronic systems, such as the audio system, for playing the media files from the player. In one known configuration, a media player may be connected via an analog audio output (e.g., a headphone jack) from the media player to the auxiliary input of the vehicle's audio system, such that the playback is controlled by the controls of the media player. In another known configuration, the media player's control interface is coupled to the control interface of the head unit of an audio system (i.e., radio), in addition to connecting the analog audio output of the media player to auxiliary input of the vehicle's audio system. In this configuration, the user can control the playback of the media from the head unit of the audio system. Yet, in another configuration, an audio system may include a database of meta data about certain media files. The audio system is configured to determine the meta data of a media file based on a unique identifier relating to that file.

It would be advantageous to provide a system for extracting meta data from a media player in a vehicle that is configured to: 1) establish a communication link between a control module and a media player; 2) identify media files stored on a media player; 3) retrieve meta data from a media file of the media player upon receiving a command from a user; 4) automatically retrieve meta data from a media file of the media player upon establishing a wireless communication link with the media player; 5) generate and/or update a database of meta data based on the meta data extracted from the media player, including converting the information to acoustic baseforms so that a user may access and manipulate the media files via voice commands and speech recognition; 6) audibly list the meta data entries of a media file based on an audible command of the user; 7) generate a second database of meta data using the meta data extracted from a second media player, wherein the meta data of the first media player is retained across power cycles, thereby eliminating the time consuming process of extracting meta data each time a media player is connected to the system; and 8) provide for the use of multiple databases concurrently, for example, when two or more media players are linked to the control module concurrently.

SUMMARY

In accordance with one embodiment, a method is provided for extracting meta data from a digital media storage device in a vehicle over a communication link between a control module of the vehicle and the digital media storage device. The method includes establishing a communication link between control module of the vehicle and the digital media storage device, identifying a media file on the digital media storage device, and retrieving meta data from a media file, the meta data including a plurality of entries, each entry including text data or enumerated code. The method further includes identifying the text data or code in each entry of the media file and storing the plurality of entries in a memory.

In accordance with another embodiment, a control system in a vehicle is provided for extracting meta data from a digital media storage device over a communication link. The system includes a communication module for establishing a communication link with the digital media storage device, a processing module coupled to the communication module, the processing module being configured to retrieve via communication module meta data associated with a media file from the digital media storage device, the meta data including a plurality of entries, wherein each of the plurality of entries includes text data, and a memory module configured to store the plurality of entries retrieved from the digital media storage device.

BRIEF DESCRIPTION OF THE DRAWINGS

The innovation will be more readily understood by reference to the following description taken with the accompanying drawings, in which:

FIG. 6 illustrates a method for speech-enabled playback of a media file in accordance with an embodiment.

FIG. 7 illustrates a method for audibly listing media files in accordance with an embodiment.

DETAILED DESCRIPTION

Figure 1:
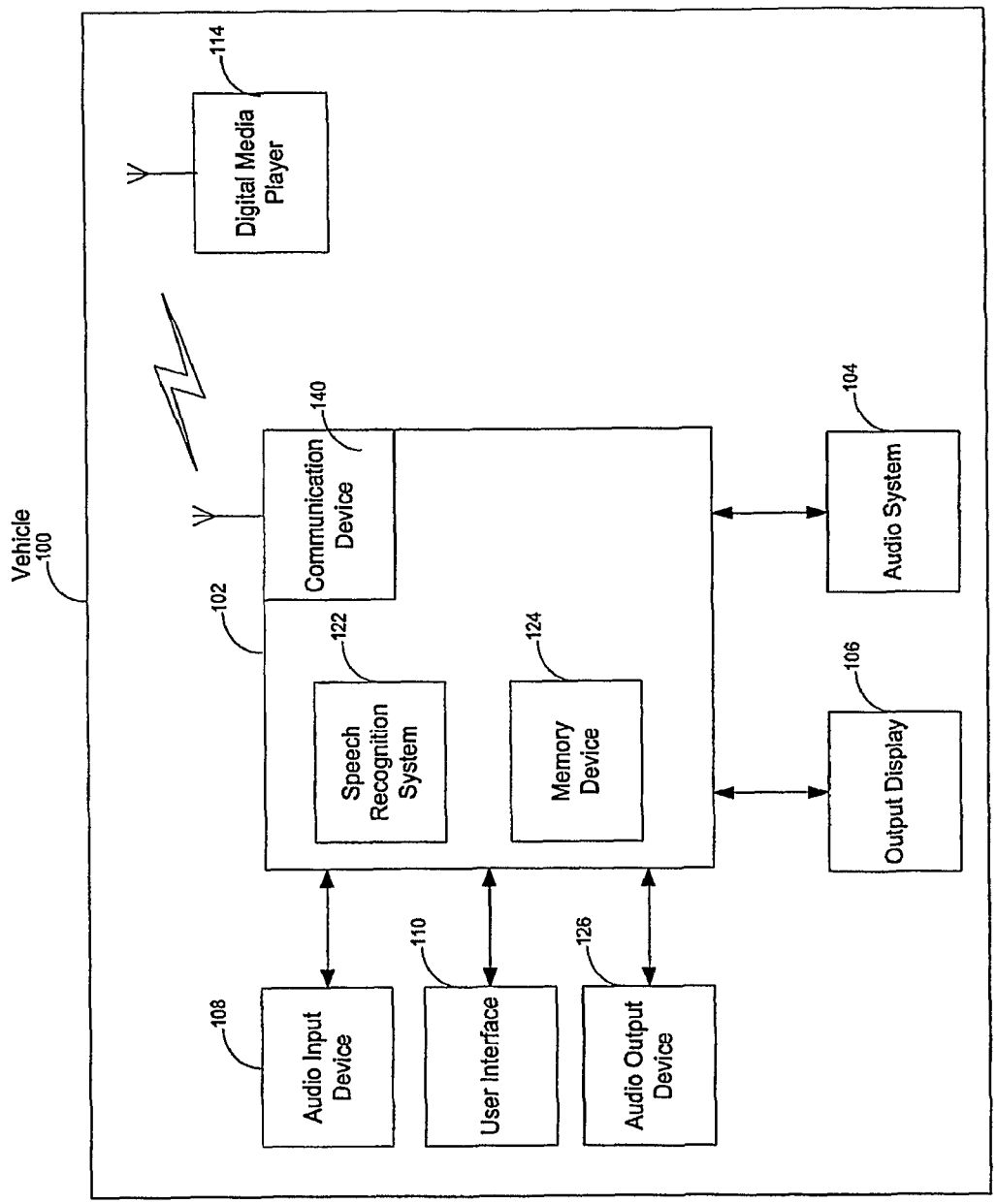
FIG. 1 is a block diagram of a control system for extracting meta data from a media player in a vehicle in accordance with an exemplary embodiment.

FIG. 1 is a block diagram of a control system for extracting meta data from a media player in a vehicle in accordance with an exemplary embodiment. The control system enables a vehicle occupant, such as a driver, to extract the meta data from the occupant's media player 114 and subsequently generates a phonemic representation of the extracted text data. Other vehicle occupants (e.g., passengers) may also use the system to extract the meta data from their personal media player 114. Alternatively, a control system may be provided that extracts meta data from a mass storage device. However, the description herein will primarily refer to an exemplary control system for extracting meta data from a media player 114. It should be understood that although a system for extracting meta data will be described in detail herein with reference to media player 114, one or more of the systems and methods for extracting meta data herein may be applied to, and find utility in, other types of digital storage or audio/video devices as well. For example, one or more of the systems for extracting meta data may be suitable for use with a flash drive, a micro hard drive, a USB memory stick, etc., all of which may require certain device-specific hardware and software to extract the meta data.

The exemplary system shown in FIG. 1 enables a wireless communication link to be established between an audio system 104 of vehicle 100 and a media player 114 (e.g., a media player with a Bluetooth-enabled connection) of a vehicle occupant. Alternatively, a control system may be provided that includes a wired connection to a vehicle occupant's personal media player 114. The wired connection may include a cradle for media player 114 or a similar wired adapter, such as an analog audio output connection (e.g., a headphone jack). The following description will refer to an exemplary control system using a wireless communication link between the vehicle audio system and media player 114 of a vehicle occupant, however, it should be understood that methods and systems for retrieving and processing meta data from a media player described herein may be used in conjunction with other configurations of control systems, such as a wired connection to a vehicle occupant's media player, etc.

In FIG. 1, the control system in vehicle 100 includes a control module 102 coupled to the audio system 104 and an antenna 112. In an alternative embodiment, control module 102 may be incorporated into audio system 104. Antenna 112, in conjunction with a communication device 140 in control module 102, enables two-way communication with media player 114. Communication device 140 may be configured as a communication circuit including analog and/or digital components, such that communication device 140 is capable of transmitting and receiving short-range radio frequency ("RF") signals in any of a variety of data transmission formats, such as a Bluetooth communications protocol, an IEEE 802.11 communications protocol or other personal area network wireless communications protocols or data formats. Media player 114 may include a plurality of transceiver circuits, for example, a Bluetooth transceiver circuit configured to communicate with communication device 140.

Control module 102 is also coupled to a user interface 110 and an audio input device 108. User interface 110 may be used to receive input commands from a vehicle occupant via, for example, pushbuttons, switches, a keypad, a touch screen display, etc. Alternatively, input commands to control module 102 may include a set of audio signals from a vehicle occupant. For example, a vehicle occupant may speak directly into the audio input device 108 to provide input commands to the control module 102. Audio input device 108 may include one or more audio input devices configured to receive an oral command from a vehicle occupant. The oral command may be any word or phrase that the occupant may speak, utter, or otherwise provide to cause the control system or another system to perform a function. A speech recognition system (or data processing module) 122 in control module 102 may be used to process various data signals, such as audio signals (e.g., oral input commands) received via audio input device 108 and to recognize words or phrases in the oral command. Voice recognition technologies known in the art may be implemented in speech recognition system 122. For example, speech recognition system 122 may comprise any speech recognition software or engine such as IBM Embedded ViaVoice®, manufactured by International Business Machines Corporation.

Control module 102 may also be coupled to a display 106. Display 106 may comprise a small cathode ray tube (CRT), liquid crystal display (LCD), or various other types of visual displays which are easily visible in various lighting conditions. Control module 102 may comprise one or more analog and/or digital electrical or electronic components, and may include a microprocessor, a microcontroller, application-specific integrated circuit (ASIC), programmable logic and/or other analog and/or digital circuit elements configured to perform various input/output, control, analysis and other functions described herein. Control module 102 may also include memory 124, including volatile and non-volatile memory in order to, for example, store a computer program, other software, or a data file to perform the functions described herein. Each element in vehicle 100 shown in FIG. 1 may be mounted in or coupled to the same or different interior vehicle elements such as a dashboard, an overhead console, an instrument panel, a visor, a rearview mirror, or other appropriate locations within the vehicle. Preferably, user interface 110, audio input device 108 and output display 106 are mounted in a location convenient to the vehicle occupants, in particular, the driver.

Audio system 104 may include, for example, a radio, an amplifier and at least one speaker configured to provide audio signals to one or more vehicle occupants. The speakers (not shown) are configured to receive audio output data from control module 102 and/or other systems (e.g., a digital audio file from a media player, information prompts or other messages provided by control module 102, etc.). The speakers may be a part of the vehicle audio system 104 or may be a dedicated audio output device 126 serving only control module 102.

As mentioned above, in the exemplary system shown in FIG. 1, control module 102 is linked via a wireless communications link with a media player 114 of a vehicle occupant. A communication link may be established with different media players as different occupants are enabled to use the control system. A communication link may be established, for example, in response to a command received from the user via user interface 110 or an oral command received via audio input device 108. The wireless communication link operates in accordance with a wireless communication standard, such as Bluetooth communication protocol, IEEE 802.11 communication protocol, or other appropriate wireless communication standards. Accordingly, media player 114 is enabled to operate in accordance with or to communicate with the wireless communications standard used for the wireless communication link.

The communication link between control module 102 and media player 114 enables extraction of meta data from the media files stored in media player 114 to control module 102. Subsequently, the playback of the media files is controlled from user interface 110 or audio input device 108. For example, after a communication link is established between a media player 114 and control module 102, the process of extracting the meta data may begin upon establishing the communication link or as a result of a command by a user. The user may provide the command via inputting the command into the user interface 110 or spoken commands into audio input device 108. For example, a song may be played through control module 102 and audio system 104 by receiving an oral command from a vehicle occupant and sending the playback command to media player 114 via the wireless communication link. Audio information received by control module 102 may be provided to the user via audio system 104 (e.g., via speakers, not shown) and data retrieved from the media player 114 may be displayed on display 106. Media player 114 may be located anywhere within the proximity of vehicle 100, such as in an occupant's pocket or briefcase, in the trunk or within a range of communication with communication device 140.

Figure 2:
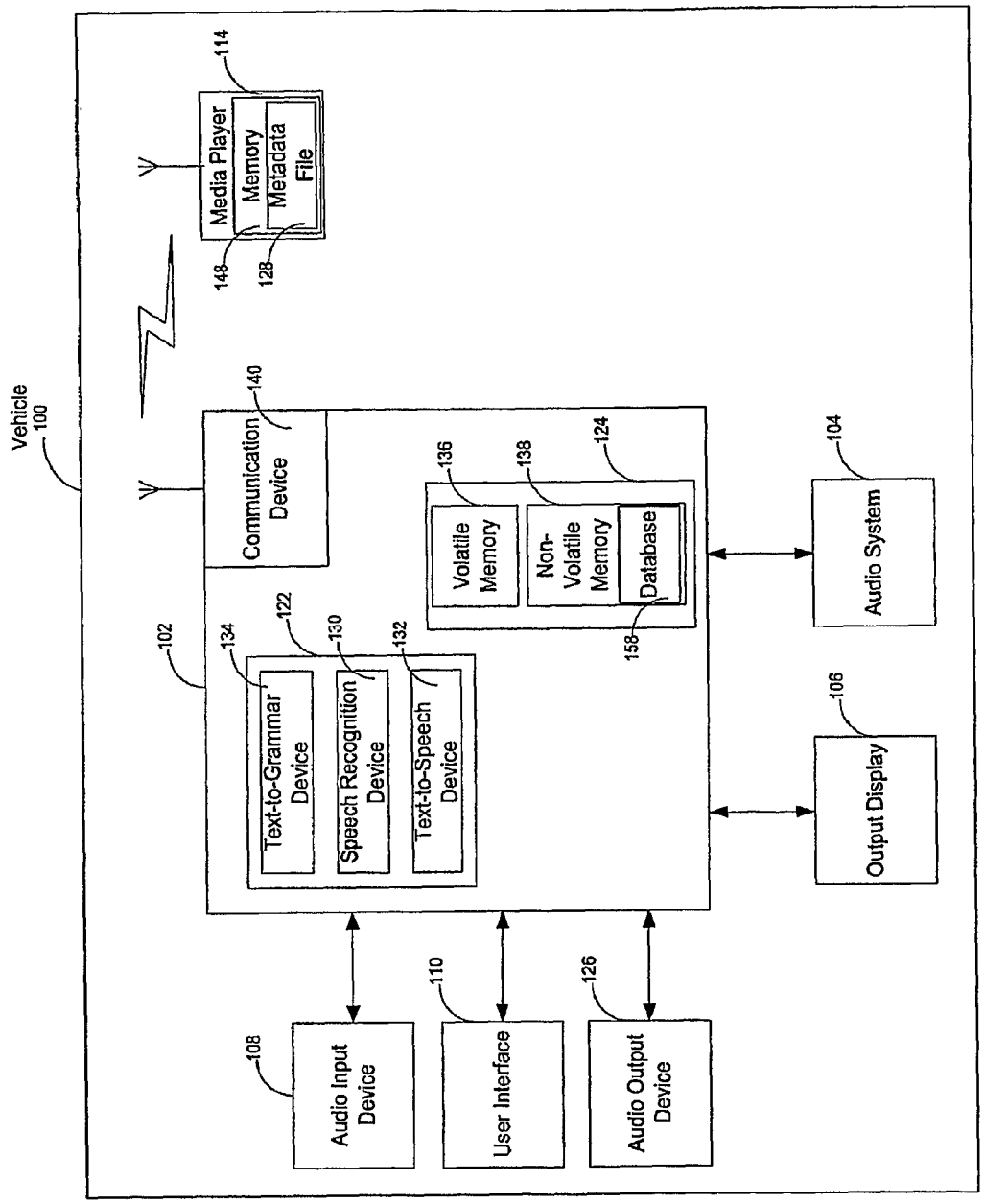
FIG. 2 is a block diagram of a control system for extracting meta data from a media player in a vehicle including the control module of FIG. 1 in accordance with an embodiment.

FIG. 2 is a block diagram of a control system for extracting meta data from a media player in a vehicle including the control module 102 of FIG. 1. Memory 124 includes volatile memory 136 and non-volatile memory 138 for storing computer or software programs to perform functions of control module 102. For example, memory 124 includes a predetermined vocabulary of command words that may be recognized by speech recognition engine 130 of speech recognition system 122. The predetermined vocabulary may be used to manipulate systems and applications in the vehicle, in order to perform a function. Speech recognition engine 130 is configured to recognize words or phrases in an oral command and to compare the recognized word to the predetermined vocabulary of command words, in order to determine an appropriate action and/or the appropriate system or application to which an instruction should be delivered. Speech recognition system 122 also includes a text-to-speech engine 132 and a text-to-grammar engine 134. Text-to-speech engine 132 is configured to convert text (e.g., ASCII text) to an audio representation (e.g., PCM) that may be played through audio output devices 126 or audio system 104. Text-to-grammar engine 134 is configured to convert text (e.g., ASCII text) to a phonemic representation that may be used by speech recognition engine 130 to recognize words or text in an oral command from a user. Text-to-speech engine 132 and text-to-grammar engine 134 may be part of the same application or different applications. Text-to-speech and text-to-grammar technologies known in the art may be used such as Embedded ViaVoice® Text-To-Speech engine and Text-To-Grammar engine, manufactured by International Business Machines Corporation.

Memory 124 includes a database 158, which may also be used to store meta data for the media files of each unique media player or other mass storage device for use by a user during operation of the control system with a particular media player. Memory 124 may include meta data for each media file extracted from a media player. The meta data of each media file includes a plurality of entries. Each media file comprises audio data and meta data, wherein the meta data may include a plurality of entries, representing a context of each media file in memory 124, such as song title (e.g., "We Belong Together"), album title (e.g., "Breakthrough"), artist (e.g., John Doe), genre (rhythm and blues), time length (e.g., 3:10), and track number (Track 5), etc. In FIG. 2, media player 114 include media file data 128, such as song title, album title, artist, genre, time length, track number, etc., stored in, for example, memory 148 of media player 114. A user may utilize known methods to add, edit, and other wise manipulate media files in media player 114. Memory 148 may also include meta data for each media file in memory 148 of media player 114. Each media file may include a plurality of entries, representing a context of each media file in memory 148, such as song title, album title, artist, genre, time length, and track number, etc. As mentioned, control module 102 includes database 158 stored in memory 124. Preferably, database 158 is stored in non-volatile memory 138 (e.g., flash EPROM) and is, therefore, maintained across power cycles of the control system.

In one embodiment, the media file data 128 are retrieved automatically by control module 102 when a wireless communications link is established between control module 102 and media player 114. In one embodiment, media file data 128 retrieved from media player 114 may be stored in volatile memory 136 (e.g., DRAM). Accordingly, the media file data stored in volatile memory 136 is not preserved across power cycles of the control system. In an alternative embodiment, the media file data may be stored in non-volatile memory 138 (database 158 shown in FIG. 2) and may be maintained across power cycles and available to a user after power-on initialization. When a second wireless communications link is established with a different media player (e.g., the media player of another vehicle occupant), the data in volatile memory 136 may be overwritten with the media file data from the second media player. Alternatively, each user may have a media files with meta data from their associated media player stored in non-volatile memory 138. In this embodiment, the media file data for a particular media player 114 would only be accessible when that particular user's media player 114 is connected to the control system via the wireless communications link. Each media player 114 may have a unique identifier that identifies one user's media player 114 from another media player.

Figure 3:
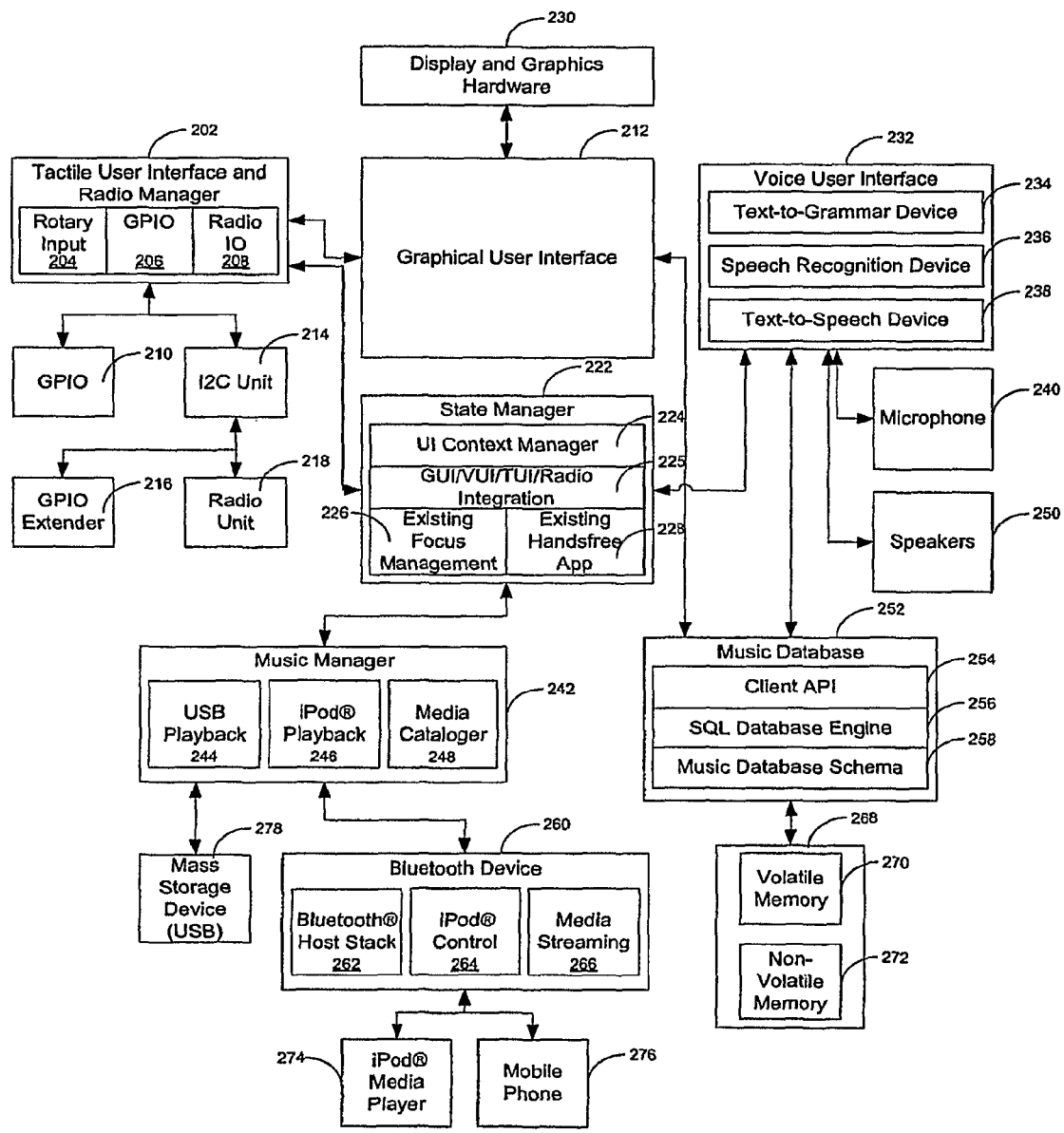
FIG. 3 is a block diagram of an integrated system for controlling a vehicle's audio and telephony systems.

FIG. 3 is a block diagram of an integrated system for controlling a vehicle's audio and telephony systems. The control system of FIG. 3 enables a user to connect a digital media storage device, such as an iPod® media player, in order to extract meta data from the digital media storage device. FIG. 3 illustrates a preferred embodiment of the software architecture employed to support a control system of FIG. 1.

Music manager 242 includes a media cataloger 248 which is configured to extract the meta data from the connected media device (e.g., mass storage device, media player, mobile phone, etc.). In the case of mass storage device 278, it may be connected via a universal serial bus (USB) connection. Media cataloger 248 searches through the file structure of mass storage device 278, in order to identify audio media stored in memory of the device. Media cataloger 248 is configured to parse the media file to locate the embedded metadata (ID3 tags) and extract them. USB Playback 244 decodes the audio media during file reading and playback of the audio media files. Media cataloger 248 also searches through the audio media files for various file parameters, including an ID3 tag, which is a tagging format for MP3 files. Media cataloger 248 may be configured to perform the meta data extraction on a file by file basis, such that media cataloger 248 creates a database, which is shown as music database 252. Media cataloger is configured to request that the user re-catalog the media files on the device, when it detects that a modification or addition has been made to the media files. It should be understood that mass storage device 278 may include media storage devices, such as a thumb drive, a USB stick, etc.

In the case of media player 274 (such as an iPod® media player), it may connect to music manager 242 through a wireless connection with a Bluetooth dongle. An after-market dongle, called naviPlay™, is currently manufactured by TEN Technology. Impulsesoft Corporation also created a proprietary protocol that enables the system to extract the meta data from an iPod® media player. Upon connecting the Bluetooth dongle with an iPod® media player, the iPod control 264 recognizes that an iPod® media player is connected. Media cataloger 248 interfaces with Bluetooth control module 260, in order to request the meta data over the Bluetooth connection. Media streaming 266 includes a streaming profile such as advanced audio distribution profile (A2DP), which is used for controlling the streaming of audio data from media player 274 or mobile telephone 276 to the system. It should be further understood that the scope of the present innovation is not limited to an iPod® media player. Media player 274 may include any of several types of media storage devices, digital audio/video players, etc., capable of storing media files in memory.

Additionally, mobile telephone 276 is shown coupled to Bluetooth control module 260 through Bluetooth host stack 262. Bluetooth control module 260 preferably includes a hands-free profile, in order to inter-operate with the Bluetooth HFP-enabled mobile phone. Alternatively, mobile phone 276 may be a Bluetooth-enabled phone with a hands-free profile. In an alternative embodiment, mobile telephone 276 may also include a media player for streaming-in media files over a Bluetooth connection. Mobile telephone 276 is configured to stream-in audio via media streaming 266. Media cataloger 248 is further configured to extract the meta data from mobile telephone 276, wherein the meta data are stored in music database 252.

Music database 252 preferably includes a client application programming interface (API) 254 for media cataloger 248 to invoke for requests for cataloging media files. Music database 252 may also include SQL database engine 256 and music database schema 258, serving as a relational database management system. A memory module 268 is coupled to music database 252. Music database 252 includes a volatile memory 270 (e.g., RAM) and a non-volatile memory 272 (e.g., flash). Accordingly, a meta data catalog stored in volatile memory 270 is not preserved across power cycles of the system, whereas the media file may be stored in non-volatile memory 272 and may be maintained across power cycles and available after a power-on initialization.

Once the media device (e.g., mass storage device 278, media player 274, mobile phone 276, etc.) has connected, music manager 242 informs state manager 222 that a media device has been located (e.g., a Bluetooth-enabled device is found or a mass storage device has been connected). If cataloging for the media device is necessary, music manager 242 informs state manager 222 that cataloging has been completed. State manager 222 uses these data to update graphical user interface (GUI) 212 and voice user interface (VUI) 232 that cataloging is occurring and/or has been completed via UI Context Manager 224 and integration module 225. The interface between state manager 222, GUI 212, and VUI 232 demonstrate how a synchronous multimodal user interface is achieved. Existing focus management 226 controls various vehicle systems when multiple systems are in use at the same time. Existing hands-free application 228 controls the operation of the connected mobile phone and other vehicle systems when the mobile phone receives a call. For example, if the user is playing back music when the mobile phone receives a call, the system may be configured to pause music playback at that time. Subsequently, the user can disconnect the call and have the music playback automatically resume.

VUI 232 includes speech recognition engine 234, text-to-speech engine 236, and text-to-grammar engine 238. Microphone 240 and speakers 250 are preferably coupled to VUI 232 for processing various data signals, such as audio signals (e.g., oral input commands, audio output data, etc.). When the cataloging process is complete, state manager 222 notifies VUI 232 that the media device has been cataloged. Upon receiving the update from state manager 222 that cataloging is complete, VUI 232 is configured to parse through music database 252 for each of the entries of the meta data and convert the entries to an acoustic baseform (i.e., phonemic representation of the entry). The acoustic baseforms are stored in a baseform list in volatile memory 270. Therefore, the baseform list is not preserved across power cycles of the system. In an alternative embodiment, music manager 242 is notified by a power module (not shown) that the system is shutting down. Music manager 242 writes the RAM-based database(s) to non-volatile memory 272, in order to be maintained across power cycles.

Additionally, VUI 232 includes software logic for converting text data, including acronyms, punctuation, and unique sounding names, into an acoustic baseform. Text-to-speech engine 236 is configured to convert several such meta data entries. For example, text-to-speech engine 236 is configured to recognize and convert the artist's name "INXS," which phonetically sounds like "in excess." Another example would be the artist's name "0.38 Special," which phonetically sounds like "thirty-eight special" instead of "point three eight special" In one embodiment, the software logic is embedded directly into VUI 232, wherein VUI 232 best converts the text data according to its own rules. In an alternative embodiment, the system may use a connected mobile phone (e.g., mobile phone 276) to create a dial-up connection to the Internet to access an online music database. Alternatively, the system can access a shared network drive or a database that includes a phonetic representation in speech synthesis mark-up language (SSML). Text-to-speech engine 236 may use the SSML to pronounce the entry correctly and to create the correct acoustic baseform for the entry of the meta data.

Music manager 242 further includes a USB playback 244 and iPod® media player playback 246. Using either in GUI 212 or VUI 232, the user may select a mode to playback media files with USB playback 244 or iPod® media player playback 246. When the user selects a mode of playback, GUI 212 and/or VUI 232 determine how playback will happen. Upon selecting the artist to be played (e.g., "play the Beatles"), state manager 222 notifies music manager 242, and music manager 242, through the two playback sub-components, accesses music database 252 through the client API 254 to find all the tracks associated with the specified artist. The tracks may then be played back in a pre-determined order or at random. For example, a user may decide to playback the Beatles' albums in alphabetical order and then within the albums, in the individual track order. Alternatively, a user may decide that to play the albums in the chronological order, starting with the first Beatles' album.

Tactile user interface (TUI) 202 includes rotary input 204, general purpose input/output (GPIO) 206, and radio input/output ("radio IO") 208. TUI 202 is coupled to GPIO 210 and I2C unit 214 (or I$^2$C), which is a serial bus. I2C unit 214 is coupled to GPIO Extender 216 and radio unit 218. Radio unit 218 preferably includes an AM/FM tuner, a power amplifier, equalizer, a satellite radio, and an auxiliary input.

As the system is playing back the selected track, music manager 242 preferably provides playback status of the track. Media cataloger 248 is configured to perform the meta data extraction, which includes extracting data such as song title, album title, artist, genre, time length, track number, the elapsed time, the recording label, featured artist(s), etc.

State manager 222 is configured to provide the playback status to GUI 212 and VUI 232. GUI 212 can show the playback status of the current track in the list of the selected tracks. VUI 232 also allows the user to "barge in," to the playing track and input a desired command. For example, a user may press a button, in order to activate speech recognition engine 234, and, then, the user may utter the appropriate command to begin playback of another media file (e.g., "next," "pause," "play 'Yellow Submarine'").

Figure 4:
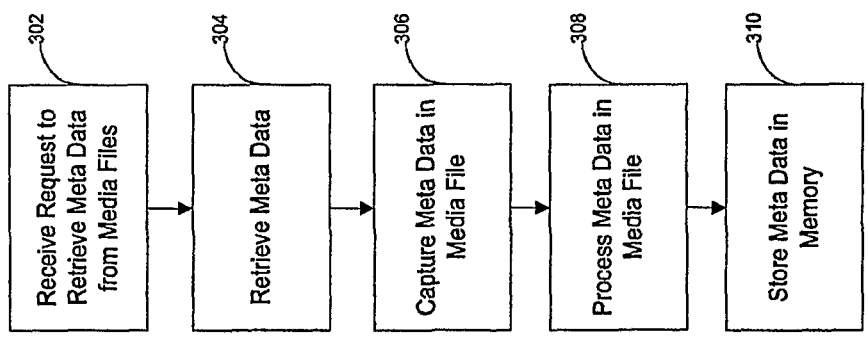
FIG. 4 illustrates a method for extracting meta data from a media player in response to a user command in accordance with an embodiment.

FIG. 4 illustrates a method for retrieving media file data from a media player in response to a user command in accordance with an embodiment. Media file data 128 from media player 114 is retrieved in response to a command from a user in the vehicle. The command may be received via a user interface 110 (e.g., a button or switch) or as an oral command via audio input device 108. After a wireless communications link is established between control module 102 and media player 114, a user may provide a command to retrieve media file data from the media player. At step 302, control module 102 (shown in FIG. 2) receives a command from a user to retrieve media file data from the connected media player. As mentioned, a user may, provide a request via user interface 110 (FIG. 2), for example, using a button or switch. Alternatively, the user may provide an oral command to request retrieval of the meta data. At step 304, control module 102 sends a request to the media player 114 via the wireless communications link and retrieves the meta data from the media player 114. Once the media file data are transferred to control module 102, the data are captured in a file at step 306. The retrieved media files are then processed at step 308 before being stored in memory 124. After processing, the media files are stored in memory 124 (shown in FIG. 2). As mentioned previously, the media file data may be stored in volatile memory 136 (shown in FIG. 2). Accordingly, the media file data are not preserved across power cycles of the control system. Preferably, the media file data may be stored in non-volatile memory 138 (shown in FIG. 2) and may be maintained across power cycles and available to a user after power-on initialization. As mentioned above, when a wireless communications link is established with a different media player (e.g., the media player of another vehicle occupant), the data in volatile memory 136 is overwritten with the media file data from the new media player.

Figure 5:
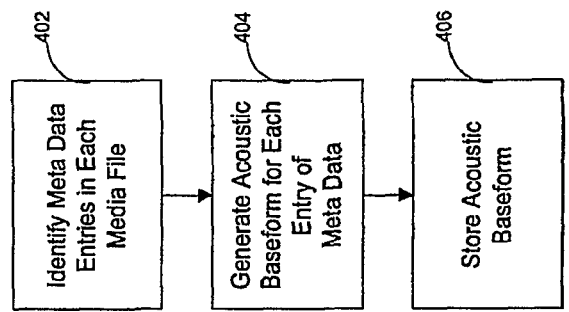
FIG. 5 illustrates a method for processing media file data from a media player and organizing the media files in accordance with an embodiment.

FIG. 5 illustrates a method for processing media file data from a media player. At step 402, control module 102 (shown in FIG. 2) accesses the media files and identifies the individual entries of the meta data such as song title, album title, artist, genre, time length, track number, the elapsed time, recording label, featured artist, etc. An acoustic baseform may be generated for the text data of each entry of a media file using text-to-grammar engine 134 (shown in FIG. 2). The acoustic baseform is a phonemic representation that may be used by the speech recognition engine 130 (shown in FIG. 2) to recognize a user's utterance and, therefore, allow speech recognition to be performed against each entry of a media file. At step 404, an acoustic baseform is generated based on the text data of the media file. At step 406, the acoustic baseforms are stored in a baseform list that is associated with the media files. Accordingly, speech recognition may be performed against the text data of a media file. Returning to FIG. 4, once the media file data are stored in memory in step 310, the media files are available to a user for speech-enabled manipulation of a media file.

As mentioned, a user may manipulate (e.g., play, pause, stop, next, previous, fast-forward, rewind, etc.) a media file using an entry of the meta data stored in memory. FIG. 6 illustrates a method for speech-enabled playback using memory 124 in accordance with an embodiment. At step 502, a control module 102 (shown in FIG. 2) receives a command to initiate playback of a media file from a user via audio input device 108. In one embodiment, control module 102 prompts the user to indicate which media file to playback, at step 504. The prompt may be played via audio output devices 126 or the audio system 104. Alternatively, the user may provide (i.e., utter) the entry name with an oral command to play a song (e.g., "play <track title>"). After the system receives the track title of the desired media file at step 506, the system identifies the desired entry at step 508. If there are similar entries in the memory 124, the speech recognition engine 130 selects the best match. At step 510, the speech recognition engine determines if there is more than one entry associated with an acoustic baseform. For example, if the user commands the system to "play The White Album," the system may be configured to recognize that more than one media file is associated with that album title. The control module 102 may be configured to list (via an audible prompt or via display 106) the associated media files (e.g., songs or tracks) for that album name. Alternatively, control module 102 can also be configured to just begin playback of the media files (i.e., tracks) of the album from the beginning of album or from a pre-selected track number. The user may then select a media file at step 512. Once a media file has been determined, control module 102 prompts the user to confirm the track title of the media file at step 514. After confirmation is received at step 516, control module 102 begins playback of the media file. Alternatively, the system nay be configured to determine that there is more than one album with a particular phrase in the album title (e.g., "Greatest Hits"). In this case, control module 102 is configured to recognize that more than one album title includes the uttered phrase, based on a confidence scoring algorithm. Speech recognition engine 130 provides the best matches, and the user is then prompted to select the desired album from among the matches.

Control module 102 (FIG. 2) is also configured to provide a user with a listing of the meta data of the available media files upon request (e.g., "list albums," "list artists," etc.). FIG. 7 illustrates a method for audibly listing media files, in accordance with an embodiment. At step 602, control module 102 receives a command from the user via a audio input device 108 (FIG. 2) to list the contents of database 158 by meta data entry type. In response to the command, control module 102 audibly list the meta data entries of each media file at step 604. For example, if the user's command is "list albums," each album title would be listed. The text (e.g., album title) of each media file is converted to an audio representation using text-to-speech engine 132 and the audio may be played in the vehicle using audio output devices 126 or audio system 104. Preferably, the text of the entries is displayed in alphanumeric order sorted character by character on display 106. A predetermined time period elapses between the playing of each entry. In addition, control module 102 is configured to allow the user to interrupt the audible listing of the selected meta data by permitting the user to "barge-in." A user may barge in during the playing of an entry text or during a predetermined time after the playing of the entry in order to execute a command. If the user provides a command (i.e., barges in) at step 606, the control module 102 recognizes and performs the requested action at step 608. For example, a user may provide a command to skip to the next entry in the list of selected meta data or to skip to the entry beginning at the next alphanumeric character. A user may also provide commands to select a desired media file once it is heard or to repeat a previous entry. If a media file is selected, a user may then initiate an action (e.g., playback of a media file). When the last media file is reached (or when a file is selected) at step 610, the process ends. If the last entry has not been reached, the process returns to step 604 and continues until either an entry is selected or the last entry in the database 158 is reached.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with figures should not be construed as imposing on the invention any limitations that may be present in the figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for extracting meta data from media devices in a vehicle over a communication link between a control module of the vehicle and the media devices, the method comprising:

establishing a first communication link between the control module of the vehicle and a first media device;

identifying a first plurality of media files on the first media device;

extracting first meta data from the first plurality of media files, the first meta data including a first plurality of entries, wherein at least one of the first plurality of entries includes text data;

identifying the text data in entries of the first meta data of the first plurality of media files;

storing the first plurality of entries in a non-volatile memory as a first database of entries of meta data pertaining to the first plurality of media files and having a unique identifier associated with the first media device;

establishing a second communication link between the control module of the vehicle and a second media device;

identifying a second plurality of media files on the second media device;

extracting second meta data from the second plurality of media files, the second meta data including a second plurality of entries, wherein at least one of the second plurality of entries includes text data;

identifying the text data in entries of the second meta data of the plurality of media files; and storing the second plurality of entries in the non-volatile memory as a second database of meta data pertaining to the second plurality of media files and having a unique identifier associated with the second media device, wherein the second database of the second plurality of entries of meta data is only accessible to a user of the control system when the second media device is connected with the control module via the second communication link and the control module receives the second unique identifier corresponding with the second media device, and wherein the first database of the first plurality of entries of meta data is only accessible to the user of the control system when the first media device is connected with the control module via the first communication link and the control module receives the unique identifier corresponding with the first media device.

2. A method according to claim 1, wherein the first meta data or the second meta data are retrieved in response to establishing the first communication link between the control module and the first media device or establishing the second communication link between the control module and the second media device.

3. A method according to claim 1, wherein the first meta data or the second meta data are retrieved in response to a command by a user.

4. A method according to claim 3, wherein the command from the user is received via a user interface.

5. A method according to claim 3, wherein the command is a spoken command.

6. A method according to claim 1, wherein at least one of the first communication link between the control module and the first media device or the second communication link between the control module and the second media device is wireless.

7. A method according to claim 1, wherein at least one of the first plurality of entries or the second plurality of entries includes any of the following: song title, album title, artist, genre, time length, track number, elapsed time, recording label, recording date, composer, producer, and featured artist.

8. A method according to claim 1, further comprising generating an acoustic baseform of the text data for an entry; and
storing the acoustic baseform for the entry in a baseform list corresponding to at least one of the first database of meta data or the second database of meta data.

9. A method according to claim 8, wherein the acoustic baseform is configured to allow each entry to be speech recognized.

10. A method according to claim 1, further comprising identifying a playlist on the first media device or the second media device; and
retrieving the playlist from the first media device or the second media device, wherein the playlist includes a custom arrangement of media files.

11. A control system in a vehicle for extracting meta data from media devices in the vehicle over a communication link, the system comprising:
a communication module for establishing a first communication link with a first media device;
a processing module coupled to the communication module, the processing module being configured to extract, via the communication module, first meta data associated with a first plurality of media files from the first media device, and wherein the first meta data includes a first plurality of entries, wherein at least one of the first plurality of entries includes text data; and
a non-volatile memory module configured to store the first plurality of entries retrieved from the first media device as a first database of entries of meta data pertaining to the first plurality of media files and having a unique identifier associated with the first media device;
wherein the communication module is further configured to establish a second communication link with a second media device,
wherein the processing module is further configured to extract, via the communication module, second meta data associated with a second plurality of media files from the second media device, the second meta data including a second plurality of entries, at least one entry including text data,
wherein the memory module is further configured to store the second plurality of entries retrieved from the second media device as a second database of entries of meta data pertaining to the second plurality of media files and having a second unique identifier associated with the second media device, and
wherein the control system is configured to allow access, by a user of the control system, to the second database of the second plurality of entries of meta data based on a connection status of the second media device and the second unique identifier corresponding with the second media device, and the control system is configured to allow access, by the user of the control system, to the first database of the first plurality of entries of meta data based on the connection status of the first media device and the unique identifier corresponding with the first media device.

12. A system according to claim 11, wherein the processing module is configured to identify the text data of an entry and generate a phonemic representation of the text data of the entry.

13. A system according to claim 12, further comprising a text conversion engine configured to convert the text data of an entry to an audible speech representation of the text data.

14. A system according to claim 12, wherein the phonemic representation of the text data of an entry is configured to facilitate speech recognition of the entry of the media file.

15. A system according to claim 11, further comprising a user interface configured to receive input, to select at least one media file based on the media file's associated meta data, and to play the media file's audio data via an audio system by streaming-in the audio data from at least one of the first media device or the second media device.

16. A system according to claim 15, wherein the user interface comprises a display and the processing module is configured to provide meta data to a user via the display.

17. A system according to claim 11, further comprising an audio input device configured to receive oral input commands from a user.

18. A system according to claim 11, further comprising a speech recognition module configured to compare oral input commands received from a user to a predetermined set of input commands, wherein the speech recognition module determines an appropriate response based on the oral input command.

19. A system according to claim 11, wherein the system is configured to support media encoding/decoding algorithms, including any of the following: MP3, MP3 Pro, Ogg Vorbis, Advanced Audio Coding (AAC), Windows Media Audio (WMA), and Waveform Audio (WAV).

* * * * *